July 29, 1969     H. STAMPFLI     3,458,769
ELECTRICALLY CONTROLLED VALVE
Filed Aug. 16, 1966
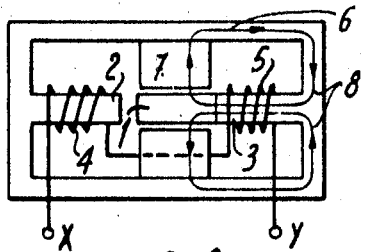
PRIOR ART    FIG. 1
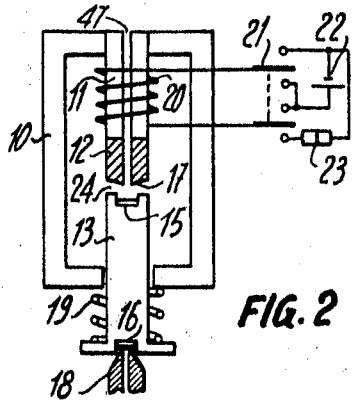
FIG. 2
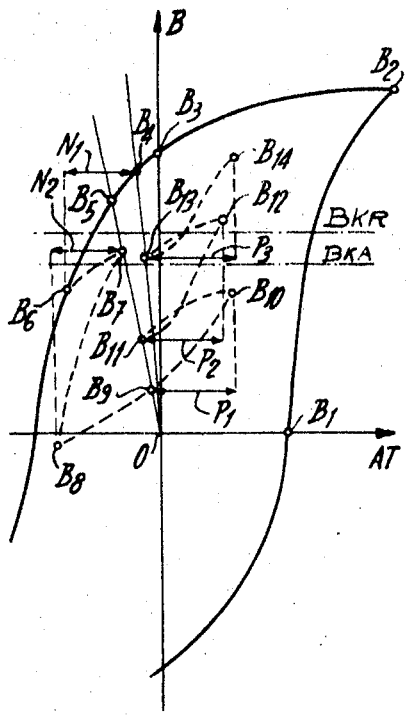
FIG. 4
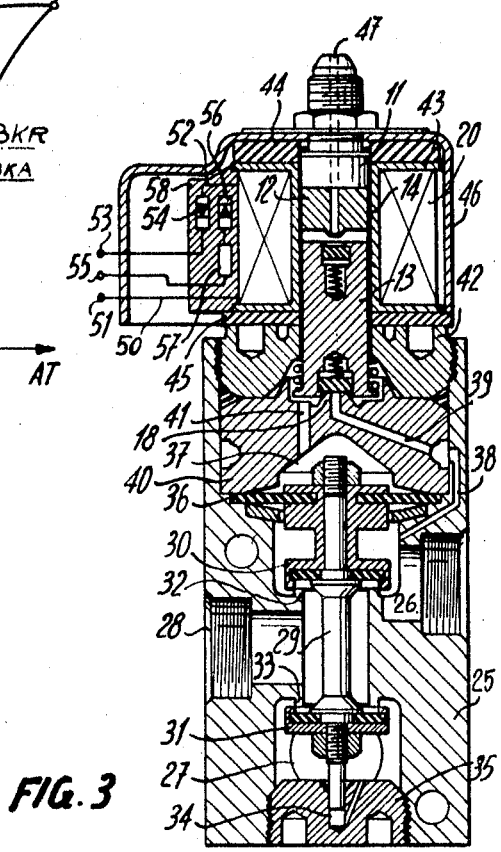
FIG. 3
INVENTOR
HARALD STAMPFLI
BY
*Emory G. Groff Jr.*
ATTORNEY United States Patent Office 3,458,769
Patented July 29, 1969

3,458,769
ELECTRICALLY CONTROLLED VALVE
Harald Stampfli, Petit-Saconnex, Geneva, Switzerland, assignor to Lucifer S.A., Carouge-Geneva, Switzerland, a corporation of Switzerland
Filed Aug. 16, 1966, Ser. No. 572,807
Claims priority, application Switzerland, Aug. 27, 1965, 12,080/65
Int. Cl. H01h 47/22
U.S. Cl. 317—123                                6 Claims

ABSTRACT OF THE DISCLOSURE

An electrically controlled valve includes a magnetic circuit and an electric winding adapted to generate a magnetic flux in the circuit. A movable core, which controls the operation of the valve, is inserted in the magnetic circuit and separated by a gap from a permanent magnet forming part of the circuit. The magnetic circuit is so dimensioned that, in order to produce the attraction of the movable core it is necessary to apply several successive current impulses to the winding, since the energy of a single impulse is not sufficient to impart to the permanent magnet a sufficiently strong magnetization to produce the attraction of the mobile core.

---

Electrically controlled valves are constituted by valves wherein the opening and closing movements of at least one movable part or clack are controlled by an electric current passing generally through a winding adapted to produce a magnetic flux shifting a magnetic core which carries directly the valve clack controlling the opening or the closing of a pipe feeding an auxiliary mechanism acting on said clack.

All known electrically controlled valves remain generally in a predetermined position in the absence of current, whereas the permanent feeding of a current is required for maintaining them in their other position. This results however in certain drawbacks since, on the one hand, the energy required for holding a valve in the position occupied by it may be comparatively large and require incorporation of means preventing an exaggerated heating of the control winding. On the other hand, a fortuitous failure of current may lead to an untimely switching of the valve which is thus caused to pass out of one position into the other. It has already been proposed to produce pulse-operated electrically controlled valves, wherein the passage out of one position into another is obtained by feeding a current pulse controlling the shifting of a magnetic core which is thereafter held in position by locking means which may be constituted by a permanent magnet.

In the accompanying drawings:

FIG. 1 illustrates diagrammatically an embodiment of a known arrangement wherein an electrically controlled valve is operated by pulses.

FIG. 2 illustrates a modification thereof.

FIG. 3 illustrates a preferred embodiment of the invention, said figure being a cross-sectional view of an electrically controlled valve.

FIG. 4 is a diagram illustrating the magnetic condition of the permanent magnet during operation of the electrically controlled valve.

The conventional embodiment illustrated in FIG. 1 includes a movable core 1 extending between two pole-pieces 2 and 3 of a magnetic core between which it may move so as to be in contact selectively with either of the latter. These two pole-pieces form stationary cores for two windings 4 and 5 inserted in series between the two terminals X and Y. The pole-pieces 2 and 3 are connected outwardly with each other through a magnetic yoke 6 inside which a permanent magnet 7 projects so as to surround the core 1. Said core 1 is in the general shape of a sleeve and is magnetized in a manner such that the lines of force of the field pass radially through it. Thus, the outer surface of said sleeve is provided for instance with a North polarity, whereas its inner wall facing the core is given a South polarity.

For the position illustrated in FIG. 1, the core engages the pole-piece 3 of the magnetic circuit, while the field produced by the permanent magnet 7 passes for its major part through said pole-piece 3 as shown by the lines 8 defining the flux. If it is desired to shift the core 1 towards the left-hand side, so as to make it abut against the pole-piece 2, it is sufficient to feed the windings 4 and 5 with a current of a suitable polarity and intensity, with a view to producing inside the pole-piece 3 a magnetic flux the direction of which is opposed to that of the flux generated by the permanent magnet 7 while its intensity is substantially equal to that of the last-mentioned flux. The attraction exerted between the core 1 and the pole-piece 3 is thus reduced to zero, where as the attraction between the core 1 and the pole-piece 2 assumes a high value which produces a shifting of the core 1 towards said pole-piece 2. Such a known arrangement provides excellent results, but it is comparatively bulky and expensive, since it requires two separate windings.

With a view to simplifying the structure and to reducing its bulk, it is possible to resort to the conventional modification illustrated in FIG. 2. In the latter, the magnetic circuit includes a yoke 10 carrying a stationary pole-piece 11 terminating with a permanent magnet 12 of which the free end registers with a movable core 13 slidingly engaging the yoke 10.

The movable core 13 carries at each end a small cap of elastomer as shown at 15 and 16, adapted to close a corresponding nozzle 17 or 18 according to the position occupied by said core 13. In the position illustrated in FIG. 2, the core 13 engages the nozzle 18 under the pressure of a spring 19 and, in said position, said core is spaced to a substantial extent with reference to the end of the permanent magnet 12, so that a comparatively large gap 24 extends between said magnet and said core. In said position, the remanent magnetization of the magnet 12 does not produce a magnetic attraction sufficient for shifting the core 13 against the action of the spring 19. A winding 20 surrounding the pole-piece 11 may be fed by a DC pulse of either polarity as obtained by the transient closing of a two-way switch 21 connecting said winding with a battery 22. When the field produced by the winding 20 is added to that of the magnet 12, the magnetic attraction exerted on the core 13 is sufficient for shifting the latter against the action of the spring 19. When the current in the winding 20 is switched off, the core 13 remains in its attracted position in contact with the magnet 12 since the magnetic attraction exerted by the latter is much higher by reason of the reduction in size of the gap 24. To return the core 13 into the position illustrated in FIG. 2, it is then necessary to make a current pass through the winding 20 in a direction such that it produces a magnetic field opposed to that produced by the magnet 12. The spring 19 urges then the core 13 away from the magnet 12.

In such an arrangement, the stability of the core 13 in the position illustrated in FIG. 2 is questionable since, if a mechanical vibration, a shock or the like shifts mechanically the core towards the magnet 12, the core may remain attracted by the latter. As a matter of fact unless a very large travel is allowed for said core, which is not generally the case and is not consistent with the conditions to be satisfied for the hydraulic section of the arrangement, the magnetic attraction produced by the magnet 12 does not vary to a large extent when the core moves between its two positions, to wit the attracted position and the spaced position. Furthermore, the return force exerted by the spring 19 increases slightly when the core 13 moves nearer the magnet 12. The solution according to FIG. 2, although it is theoretically of interest, can hardly be resorted to in practice by reason of its unreliability.

The present invention has for its object to produce a reliably operating arrangement of the type illustrated in FIG. 2.

The invention covers in fact an electrically controlled valve including a magnetic circuit and an electric winding adapted to generate a magnetic flux in said circuit, a movable core controlling the operation of the valve, inserted in the magnetic circuit and separated from a fraction of the latter by a gap. The magnetic flux passing through the movable core and through said gap produces a magnetic attraction shifting the core against a returning force in association with a corresponding reduction in the size of said gap and in the reluctance of the magnetic circuit. According to the invention, said electrically controlled valve includes a permanent magnet the magnetic flux of which is closed across said gap and the magnetization curve of which is such that the field produced by the current passing through the winding modifies the remanent magnetization of said magnet.

The valve illustrated in FIG. 3 is a three-way valve equipped with a control system similar to that of the diagram according to FIG. 2, except for the circuit feeding the winding 20. Said valve includes a body 25 provided with a port 26 through which fluid under pressure is fed, with a port 27 through which the fluid is exhausted and with a port 28 adapted to connect either of said ports 26 and 27 with the arrangement using the fluid such as a hydraulic piston and cylinder system.

The body 25 is provided with a central recess inside which a rod 29 moves, which carries two clacks 30 and 31 adapted to engage in alternation the corresponding seats 32 and 33. The lower end of the rod 29 is guided in the bore 34 of a plug 35 closing the central recess in the body 25 while the upper end of said rod is rigid with a diaphragm 36 adapted to control the movements of said rod.

The lower surface of said diaphragm 36 is subjected to the action of the fluid under pressure fed through the input port 26 while the upper surface of said diaphragm closes a chamber 37 inside which the fluid under pressure may be fed through a channel 38 formed in the body 25. A channel 39 formed in a cover 40 is adapted to communicate with a channel 41 formed in the same cover 40 when the magnetic core 13 is remote from the nozzle 18 closing the end of the channel 39.

The cover 40 serves for securing the diaphragm 36 over the body 25 and is clamped in position by a plug 42 secured inside the body 25. Said plug 42 carries the tube 14 inside which the core 13 slides and the upper end of which surrounds the stationary pole-piece 11 and the permanent magnet 12. The winding 20 is formed round an insulating body 43 which surrounds said tube 40. The magnetic field closes through two thermo-magnetic discs 44 and 45 extending over each end of the winding 20 and through an outer iron casing 46 capping the winding 20.

When the core 13 occupies the position illustrated in FIG. 3, the feed of compressed fluid towards the upper surface of the diaphragm 36 is cut off by the closing of the nozzle 18 while the chamber 37 is connected with the outer atmosphere through the channel 41, the clearances provided between the core 13 and the tube 40 and the bore 47 extending axially through the magnet 12 and the stationary pole-piece 11. Thus only the lower surface of the diaphragm is subjected to a fluid pressure which causes the rod 29 to rise whereby the lower clack 31 closes and the upper clack 30 opens; this ensures communication of the input port 26 with the hydraulic arrangement through 28.

In contradistinction, if the core 13 is in its upper position, it closes at its upper end the bore 47 and at its lower end it allows the compressed fluid fed through 26 to enter the chamber 37. The diaphragm urges then the rod 29 downwardly so as to close the clack 30 and to open the clack 31.

In order to obtain a highly reliable operation and a stable position for the core 13 both in its position illustrated in FIG. 3 and in the position for which it is attracted and engages the magnet 12, the latter is selected in a manner such that its magnetizing curve shows a remanent magnetization modified by the magnetic flux produced by the winding 20. FIG. 4 illustrated the magnetizing curve of the permanent magnet 12 and the different magnetizing condition through which the magnet passes. Said curve gives out in abscissae the ampere turns AT of the winding 20 and in ordinates the induced field B.

The magnetizing curve is illustrated in solid lines and passes through the points $B_1$, $B_2$, $B_3$, $B_4$, $B_5$, $B_6$. If it is assumed that the field in the magnet 12 has reached a value $B_2$ under the action of the field produced by the winding 20 at the moment at which the current in said winding is switched off the field value sinks and the line defining it would pass through the portion of the curve $B_2$–$B_3$ in the case where the magnetic reluctance of the path over which the lines of force of the permanent flux of the magnet 12 close is practically zero. In the case illustrated in FIG. 3, such an ideal condition is not obtained by reason of the gap purposely formed in the execution of the arrangement so that the magnetic field of the magnet 12 moves along the curve up to the point $B_4$, the straight line connecting the point $B_4$ with the origin O forming the locus of the possible magnetization conditions in the absence of any outer field when the gap 24 formed in the structure assumes its minimum size corresponding to the attraction of the core 13 by the magnet.

FIG. 4 shows also a further straight line $B_5$–O which is the locus of the possible magnetization conditions in the case where the core 13 is spaced away from the magnet 12, the other conditions being the same as precedingly.

It will be remarked that the point $B_4$ is located above the straight line BKR illustrated in dotted lines, which defines the critical field for which the magnetic attraction is equal to the returning force exerted by the spring 19 on the core 13 in its attracted position. The other critical field corresponding to equality between magnetic attractive force and the force of the spring 19 when the core 13 is spaced away from the magnet 12 is somewhat less than BKR and is illustrated by BKA.

In order to obtain a shifting of the core 13 under the action of the spring 19, it is necessary for the remanent magnetic field to be brought to a value less than BKR, which is assumed to be obtained in the case of the graph of FIG. 4 by two negative pulses $N_1$, $N_2$. The first of said pulses $N_1$ causes the magnetization to drop from the value $B_4$ to the value $B_6$ on the curve of hysteresis and at the end of the pulse the field rises to the value $B_7$ as a result of remanence. Said point $B_7$ is located on the straight line $B_5$–O corresponding to the maximum value of the gap 24 since the fields $B_6$ and $B_7$ are underneath BKR and consequently the core 13 has returned into its remote position under the action of the spring 19. The second pulse $N_2$ causes the field to vary between $B_7$ and $B_8$ along the dotted line, which means that it sinks down to a value substantially equal to zero. By reason of the remanence, said field rises along the dotted line up to a value $B_9$ and it remains in said condition as long as no further pulses are sent into the winding 20.

If other negative pulses are fed into the winding 20, the magnetized conditions are still modified slightly but since the negative pulses are comparatively weak, the average magnetization of the magnet 12 retains comparatively low values which are much lower than the magnetic induction required for ensuring a further attraction of the core 13. It should also be remarked that the weakening of the remanent field of the magnet 12 may also be obtained through application of a low amplitude A.C. as well known by any one skilled in the art. Thus, after a number of alternations, the average magnetic induction of the magnet 12 describes a hysteresis curve of a reduced amplitude round the origin of the graph illustrated in FIG. 4.

When it is desired to shift the core 13 towards the magnet 12, pulses of a suitable polarity are fed into the winding 20. The first pulse of which the ampere turns produce a field illustrated in FIG. 4 by $P_1$ causes the magnetization to rise from $B_9$ to $B_{10}$ and, after the end of said pulse, the magnetization returns to the value $B_{11}$ under the action of remanence. A second pulse producing a field $P_2$ causes the magnetization to vary between $B_{11}$ and $B_{12}$, which latter value is higher than BKA and produces an attraction of the core 13 against the action of the spring 19. After the end of the second pulse $P_2$, the magnetization returns to the value $B_{13}$ which is still higher than BKA. A third pulse $P_3$ would bring the magnetization of the magnet 12 to the point $B_{14}$ which is sufficiently higher than BKA for it to ensure a very reliable maintenance of the core 13 in its attracted position, even when the electrically controlled valve is subjected to mechanical vibrations.

Preferably the coercive field of the magnet 12 is much larger than the field produced by a current pulse in the winding 20 for attracting the core 13 while remaining however less than four times last-mentioned field.

By reason of the arrangement described which allows modifying the remanent magnetization of the magnet 12 in successive stages, there is obtained a large reduction in the energizing power required. As a matter of fact, the different magnetization points $B_{10}$, $B_{12}$, $B_{14}$ obtained are defined by the maximum instantaneous intensity of the pulses. In contradistinction, the heating produced by the passage of current in the winding 20 is defined by the efficient value of the current. In the case where the control pulses are constituted by A.C. alternations rectified by a diode, it may be readily proved that the efficient current is equal to one half of the maximum current. In other words, the thermic energy evolved in the winding in the case where the control pulses are maintained continuously is about three to four times weaker than if the winding were fed with D.C. of an intensity which is equal to the peak values of a pulse, taking into account the losses in the iron. In practice, the gain is still more important since, as disclosed with reference to FIG. 4, the pulses $P_1$, $P_2$ show an amplitude which is smaller than that required for obtaining in a single stage with D.C. an increase in the magnetization from $B_9$ to $B_{14}$. Thus, it is not necessary to provide an oversized winding 20 for the exhaust of the heat to a sufficient extent.

In order to obtain a duration of reaction which remains substantially unvarying both for the control of the attraction of the core 13 and for the control of its release, it is of advantage to provide a difference in amplitude between the pulses $P_1$, $P_2$, $P_3$ and the pulses $N_1$, $N_2$, which latter are weaker than the former.

The electrically controlled valve illustrated in FIG. 3 includes means for producing control pulses fed out of a single source of A.C. To this end, the terminal 50 of the winding 20 is directly connected with the output terminal 51 whereas the other terminal 52 of said winding is connected with an output terminal 53 through a diode 54 and also with an output terminal 55 through a diode 56 inserted in series with a resistance 57. The diodes 54 and 56 are inserted in a manner such that their polarities are opposed.

The attraction of the movable core 13 is obtained by connecting a source of A.C. across the terminals 51 and 53, the diode 54 allowing only the alternations of a predetermined polarity to pass through the winding 20. This produces the pulses $P_1$, $P_2$, $P_3$ which are required for obtaining an attraction of the core 13 by the magnet 12.

To allow the core 13 to return into the position illustrated in FIG. 3, the same source of A.C. is connected across the terminals 51 and 55 so that the diode 56 allows only the alternations of an opposite direction to pass whereby the pulses $N_1$ and $N_2$ are obtained. The amplitude of said pulses N is smaller than that of the pulses P by reason of the presence of the resistance 57 in the circuit.

According to a modification, it is possible to cut out the diode 56, if the demagnetization of the permanent magnet 12 is ensured solely by an A.C. of a comparatively reduced amplitude, the resistance 57 being retained alone for the formation of the demagnetizing current. Obviously, the demagnetizing current may be obtained by other means and in particular it is possible to obtain pulses of a reduced amplitude by resorting to a Zener diode in series with a normal diode of an opposite polarity. Thus current can pass through the two diodes only for a predetermined polarity and provided the amplitude of the A.C. voltage supplied is higher than the critical voltage of the Zener diode. This would provide the advantage of producing demagnetization pulses by means of parts which dissipate in practice no energy, which is a favorable condition for limiting the heating of the control circuit.

Of course, it is possible to resort to other elements for the formation of positive and negative pulses, said elements being constituted for instance by transistors or else by thyristors.

The parts which serves for the formation of positive and negative pulses feeding the winding 20 may advantageously form a unit with the winding 20. Thus, in the case of FIG. 3, the diodes 54 and 56 and also the resistance 57 are embedded in a mass of insulating resin 58 which forms also a casing for the winding 20. This shows it is possible to obtain a very sturdy arrangement for the electric section of the apparatus which section is thus easily assembled.

I claim:

1. An electro-valve comprising a magnetic circuit (10) and an electric winding (20) for generating a magnetic flux in said circuit (10), a mobile core (13) for controlling the valve (16, 18), said core disposed in the magnetic circuit (10) and separated from one part of the latter by a cap (24), a permanent magnet (12) whose magnetic flux closes while traversing said gap (24), the magnetic flux produced by said permanent magnet (12) and by said electric winding (20) passing through the mobile core (13) to traverse the said gap (24), said flux producing a magnetic attraction causing the displacement of the core (13) toward said gap against the opposing action of a return force (19) accompanied by a correlative reduction of said gap (24) and of the resistance of the magnetic circuit (10), characterized in that the magnetization curve of the permanent magnet (12) is such that the field produced by the current traversing the winding (20) modifies the remanent magnetization of the said magnet (12), the magnet circuit (10) being so dimensioned that, in order to produce an attraction of the core (13), the individual energy of each current impulse is smaller than that necessary to impart to the permanent magnet (12) a sufficient attraction to cause the displacement of the core (13), said displacement being obtained only after at least two impulses, each causing an increase of the magnetization of the permanent magnet (12) with respect to its preceding state.

2. An electro-valve according to claim 1, wherein the permanent magnet (12) is surrounded by the electric winding (20).

3. An electro-valve according to claim 2, wherein the winding (20) is adapted to receive impulses whose polarity is selected to produce a field whose direction is opposite to the remanent field of the permanent magnet (12).

4. An electro-valve according to claim 3, wherein in order to produce a field of opposite direction to the remanent field of the permanent magnet (12), the winding (20) is adapted to receive an alternating current whose maximum intensity is less than the maximum intensity of the impulses causing the increases in the magnetization of the permanent magnet (12).

5. An electro-valve according to claim 4, including a diode (54) to form at least one attraction impulse from an AC source and at least one element (57) to form a demagnetization current from the same source.

6. An electro-valve according to claim 5, wherein said diode (54) and said element (57) are embedded in an insulating casing together with the winding (20).

References Cited

UNITED STATES PATENTS 3,379,214   4/1968   Weinberg _____ 335—234 X

LEE T. HIX, Primary Examiner

U.S. Cl. X.R.

137—625.64; 251—30; 317—150; 335—234, 255